United States Patent [19]

Thiele

[11] 3,941,541

[45] Mar. 2, 1976

[54] BLOW MOLDING DEVICE HAVING A BLOW MANDREL WITH A SEAL FORMING RING

[75] Inventor: Hans Dietrich Thiele, Ettlingen, Baden, Germany

[73] Assignee: PMD Entwicklungswerk fur Kunststoff-Maschinen GmbH & Co. KG, Ettlingen, Baden, Germany

[22] Filed: May 9, 1974

[21] Appl. No.: 468,414

[30] Foreign Application Priority Data

June 22, 1973 Germany............................ 2331766

[52] U.S. Cl......................... 425/292; 425/DIG. 212
[51] Int. Cl.²......................................... B29D 23/03
[58] Field of Search.......... 425/DIG. 212, DIG. 206, 425/387 B, 403, 292

[56] References Cited
UNITED STATES PATENTS

| | | |
|---|---|---|
| 3,209,401 | 10/1965 | Mehnert.......................... 425/387 B |
| 3,224,038 | 12/1965 | Budesheim............. 425/DIG. 212 X |
| 3,585,683 | 6/1971 | Wilson ........................ 425/387 B X |
| 3,819,317 | 6/1974 | Higginbotham................. 425/387 B |
| 3,827,214 | 8/1974 | Naumann..................... 425/387 B X |

*Primary Examiner*—Ronald J. Shore
*Assistant Examiner*—David S. Safran
*Attorney, Agent, or Firm*—Ernest G. Montague; Karl F. Ross; Herbert Dubno

[57] ABSTRACT

A blow mandrel for the production of hollow bodies in a hollow blow mold, in particular for the production of filled bottles sealed ready for shipment, from a length of tubing of a thermoplastic resin, having an axially displaceable blow pipe adapted to be surrounded by an edge of the mold opening. The blow mandrel comprises the aforementioned blow pipe and, at its mouth section, a sealing ring protruding outwardly beyond the circumferential surface of the blow pipe and extending in closed form in the circumferential direction of the pipe upon blowing in the region of the edge of the opening of the blow mold. The sealing ring has, on its side turned toward the mold cavity, an annular groove open in the direction of the blow-mold cavity.

2 Claims, 3 Drawing Figures

BLOW MOLDING DEVICE HAVING A BLOW MANDREL WITH A SEAL FORMING RING

The present invention relates to a blow mandrel for the production of hollow bodies in a hollow blow mold, and particularly for the manufacture of filled, closed bottles ready for shipment from a length of tubing of a thermoplastic resin. The mandrel has at least one axially displaceable blow pipe which cooperates with an edge of the mold which surrounds an opening in the blow mold to clampingly engage the tube or parison.

After the introduction of the length of tubular plastic to be expanded (parison) into the blow mold which is hermetically closed, except for an opening through which the blowing mandrel is inserted, a good seal of the cavity of the blow mold at the edge of the mold surrounding the opening is required in order to obtain a sufficiently high blowing pressure for the shaping of the parison.

For this purpose it is known to make the mouth section of the blow mandrel conical on its outer side and to provide the edge of the mold surrounding the opening of the blow mold with an oblique resting surface adapted to same, against which the blow mandrel is pressed in a conical seat. Between these oblique surfaces of the two parts, the length of tubing is clamped fast after the insertion of the blow mandrel. The plastic material serves at the same time as a seal. Due to the high blow pressures, this seal requires relatively large sealing surfaces which in the case of many blow molds are disadvantageous or cannot be provided at all. Particularly in the case of blowing devices in which the blow molds are developed for the blowing and possible filling of the hollow body through the bottom of the resulting hollow body, the upper blow-mold wall must be kept relatively thin and the edge surface thereof lying in the opening therefore small in order not to impair the shaping of the bottom.

The object of the present invention is to create a seal which is independent of the size of the resting surfaces at the opening of the blow mold when the blow mandrel is inserted.

This object is attained in accordance with the invention by providing the blow mandrel is provided at its mouth section with a sealing ring protruding outwardly beyond the wall surface and extending in closed fashion during the blowing process in the region of the edge of the opening of the blow mold in the circumferential direction of the pipe, the sealing ring having an annular groove which is open in the direction of the cavity of the blow mold.

In this way the plasticized material of the plastic tube is clamped fast at the point of seal in the region of the edge of the opening of the blow mold by the outer biting edge of the sealing ring and, with an increase in the blowing pressure, is partially forced in the form of an annular sealing lip into the annular groove of the sealing ring, this hermetically closing off the interior of the length of tubing enclosed in the blow mold.

In accordance with a further development of the invention, the sealing ring is developed on its outer edge with an annular cutting edge bent off in the direction towards the cavity of the blow mold. When the mouth section of the blow mandrel is placed on or in the opening of the blow mold, this results in an annular indentation in the tubing material so as to develop the sealing lip which is pressed under the blowing pressure against the internal groove surface of the sealing ring.

The sealing ring can be a fixed part of the blow mandrel. However, in order to be able to adapt it to the specific blow mold, it is advantageous for the sealing ring to be fastened in removable manner to the mouth section of the blow pipe, for instance screwed thereon.

Three illustrative embodiments of the invention are shown in the drawing in which.

Figure 1:
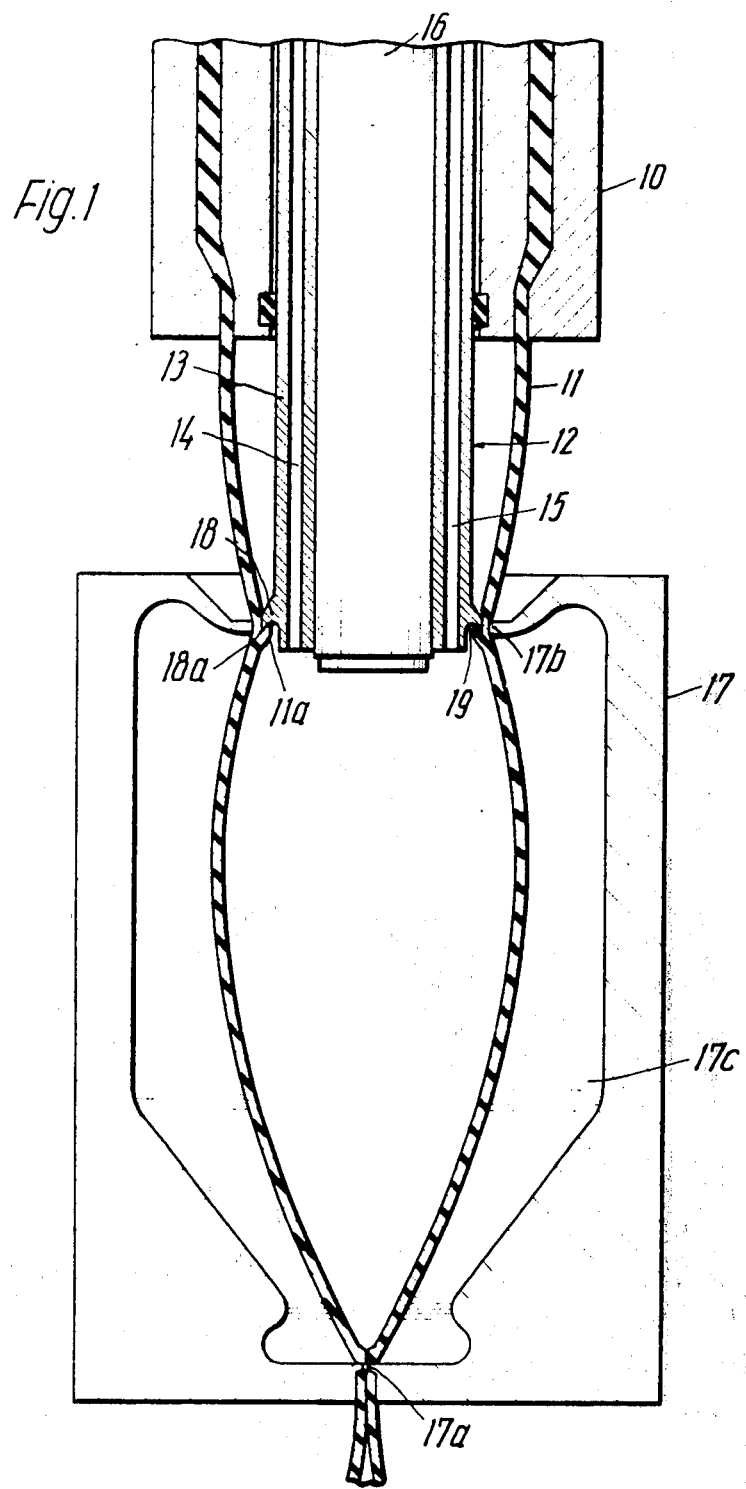
FIG. 1 is a sectional view through the essential parts of a known blowing and filling device provided with a first embodiment of the blow mandrel, and a divisible, closed blow mold.

FIG. 1 shows a head part 10 of a tube extruder known for blowing and filling devices, from which a plastic parison 11 at plasticizing temperature emerges. In the extruder head and within the tubular nozzle thereof there is concentrically supported a blow mandrel 12 which is displaceable in vertical axial direction. It comprises a blow pipe 13 with a blow-air feed channel 14 and a vent channel 15 and, in its central cavity, has a filling mandrel 16, also axially displaceable, for introducing into the shaped hollow body the material with which it is to be filled.

Below the tube extruder there is arranged a divisible blow mold 17 the mold halves of which are movable into an open position and then, after receiving a length of the plastic tube 11, into a closed position. FIG. 1 shows the closed position of the mold halves the lower closing edges 17a of which squeeze together the end section present there of the enclosed length of tube and thus form a seal.

On the side facing the tube extruder, the blow mold has an opening which is surrounded by a thin-walled mold edge 17b. When the blow mold is closed, the mouth section of the blow pipe 13 is introduced into the mold opening. In this connection the circumferential surface of a sealing ring 18 which extends on the outside from the cylindrical surface of the blow pipe in closed manner around the pipe comes against the edge surface lying within the mold opening in such a manner that the length of tubing is clamped between without any considerable displacement of material. At the same time, an annular cutting edge 18a of the sealing ring, which edge is bent off in the direction towards the mold cavity 17c, has cut longitudinally into (but not through) the tubing material clamped by the sealing ring so as to develop a sealing lip 11a extending on the inside in closed annular shape. The sealing ring is provided on the side thereof facing the mold cavity with an open annular groove 19 extending from the annular cutting edge, in which groove the sealing lip is received immediately upon the cutting by the annular cutting edge. During the following blowing process, this sealing lip is pressed by the pressure within the length of tubing enclosed in the mold against the surface of the annular groove, which results in a hermetic sealing of the inside of the mold and thus in an excellent shaping of the length of tubing. The sealing effect increases with the blowing pressure so that only a relatively low pressing of the circumferential surface of the sealing ring against the surface of the edge of the mold is necessary, and accordingly uncontrollable thin spots in the tubing material are avoided. The annular thinning of the material thereof at the sealing point as a result of the cutting for the formation of the sealing lip is unimportant, since the tubing material clamped between the surface of the edge of the mold and the circumferential surface of the sealing ring is still thicker than the wall of the hollow body after the stretching thereof into the shape of the final hollow body.

Figure 2:
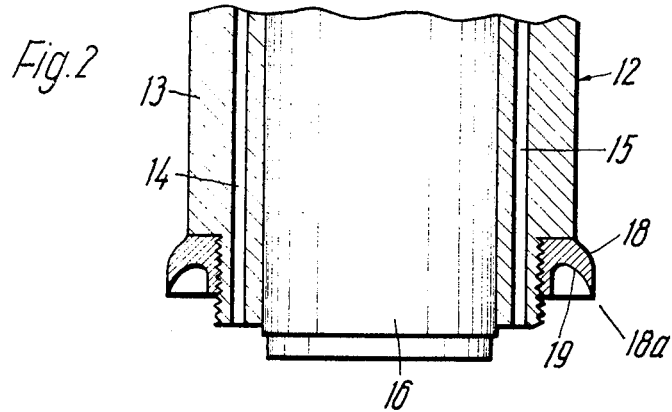
FIG. 2 is a section through the blow mandrel in FIG. 1, shown on a larger scale, in a second embodiment.

FIG. 2 shows a portion of the blow mandrel 12 of FIG. 1 on a larger scale and with a sealing ring 18 screwed in removable fashion on the mouth section of the blow pipe 13.

Figure 3:
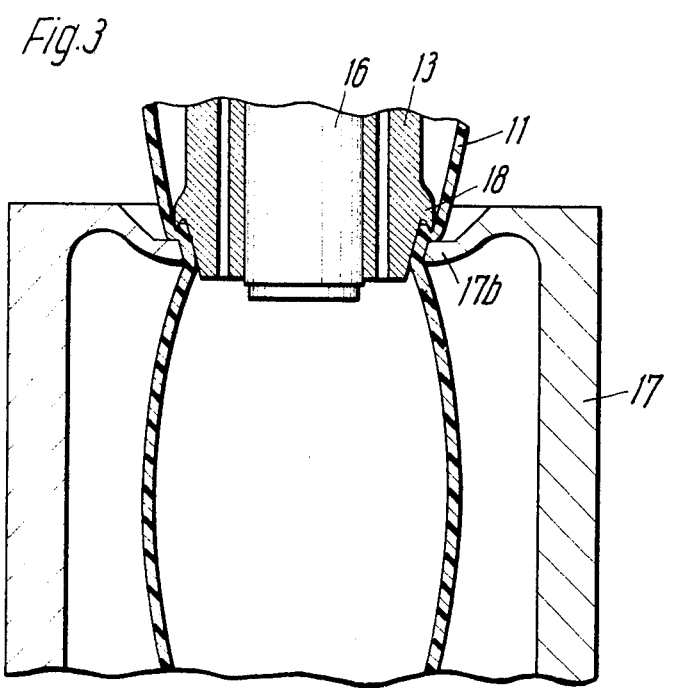
FIG. 3 is a section through the essential parts of FIG. 1, with a blow mandrel of a third embodiment.

In FIG. 3 the mouth section of the blow pipe 13 is seated in a known conical seat on the edge 17b of the blow-mold opening with the interposition of the tubing material. The sealing ring 18 is in this connection located directly above the edge of the mold at a distance away less than the thickness of the tubing material. Its annular cutting edge 18a has dug itself into the material of the tubing and its sealing lip lying within the annular groove 19 assures a hermetic seal. In this embodiment also, the pressure in the conical seat need not be as great as in the case of the known blow mandrels, since the tubing material at this place need not finally seal also against high blowing pressures.

The hermetic seal is produced in any event by the portion of plasticized plastic tubing pressed firmly under the blow pressure into the annular groove of the sealing ring, which portion is pressed in the manner of a sealing lip against the inner sealing-ring surface. The place where the sealing ring engages in the region of the edge of the opening of the blow mold and in what thickness and depth the sealing lip is developed from the tubing material is merely a question of suitability and adaptation to the specific mold.

I claim:

1. A blowing device for the production of a hollow body comprising:
   a hollow blow mold having a blow-mold cavity and an opening communicating with said cavity and formed with a thin sealing edge portion; and
   a blowing mandrel comprising
      a blow pipe axially displaceable relative to said blow mold and having at least a mouth portion adapted to extend into said cavity through said opening in a blowing position,
      a sealing ring formed on said blow pipe and axially set back from said mouth portion for sealingly clamping an extruded tube against said sealing edge portion upon introduction of said tube into said cavity for blowing therein,
      a circumferential groove formed in a flank of said ring turned toward said cavity for receiving a lip of material of said tube whereby said lip is pressed against a wall of said groove upon blowing of said tube in said cavity, and
      a circumferential biting edge sloped in the direction of said cavity and disposed along the outer circumference of said groove, said biting edge being dimensioned such that it is spaced from said sealing edge portion in said blowing position so as to penetrate into said tube to form said lip therein without penetrating through said tube.

2. The blow device defined in claim 1 wherein said sealing ring is removably threaded onto said blow pipe.

* * * * *